(12) United States Patent
Bragg et al.

(10) Patent No.: US 7,612,934 B2
(45) Date of Patent: Nov. 3, 2009

(54) NONRESONANT MULTIPLE PASS NONLINEAR STRUCTURE

(75) Inventors: William David Bragg, Plano, TX (US); Jason O'Daniel, Richardson, TX (US)

(73) Assignee: Photodigm Inc., Richardson, TX (US)

( * ) Notice: Subject to any disclaimer, the term of this patent is extended or adjusted under 35 U.S.C. 154(b) by 133 days.

(21) Appl. No.: 11/956,152

(22) Filed: Dec. 13, 2007

(65) Prior Publication Data

US 2009/0154507 A1 Jun. 18, 2009

(51) Int. Cl.
*G02F 2/02* (2006.01)
*H01S 3/10* (2006.01)

(52) U.S. Cl. .......................... 359/328; 372/22; 372/108

(58) Field of Classification Search ................ 359/326, 359/328, 329; 372/21, 22, 99, 108; 385/122
See application file for complete search history.

(56) References Cited

U.S. PATENT DOCUMENTS

| 5,321,718 | A * | 6/1994 | Waarts et al. ............... 372/108 |
| 2002/0150362 | A1 * | 10/2002 | Gutin et al. .................. 385/122 |
| 2006/0023757 | A1 | 2/2006 | Mooradian et al. |
| 2006/0233206 | A1 | 10/2006 | Miner et al. |
| 2007/0002920 | A1 | 1/2007 | Ishizu |
| 2007/0041421 | A1 | 2/2007 | Duncan et al. |

OTHER PUBLICATIONS

Paschotta, R., "Ferroelectric Domain Engineering," Encyclopedia of Laser Physics and Technology, Apr. 17, 2007, 2 pages.
Paschotta, R., "Polarization Waves," Encyclopedia of Laser Physics and Technology, Aug. 15, 2007, 4 pages.
Paschotta, R., "Quasi-Phase Matching," Encyclopedia of Laser Physics and Technology, Nov. 4, 2007, 4 pages.
Risk, W.P., et al., "Compact Blue-Green Lasers," 2003, pp. 78-79, Cambridge University Press, Cambridge, U.K.
Silfvast, W.T., "Laser Fundamentals," Second Edition, 2004, pp. 603-605, Cambridge University Press, Cambridge, U.K.

* cited by examiner

*Primary Examiner*—Hemang Sanghavi
(74) *Attorney, Agent, or Firm*—Slater & Matsil, L.L.P.

(57) ABSTRACT

A system, a structure, and a method for the generation of second harmonic light are provided. A laser system comprises a seed laser that produces a fundamental frequency light, and a nonresonant multiple pass nonlinear structure generates a second harmonic light using the fundamental frequency light. A second harmonic outcoupler outputs the second harmonic light from the laser system and a reflecting structure reflects a remaining portion of the fundamental frequency light back into the nonresonant multiple pass nonlinear structure to generate additional second harmonic light.

19 Claims, 2 Drawing Sheets

NONRESONANT MULTIPLE PASS NONLINEAR STRUCTURE

TECHNICAL FIELD

The present invention relates generally to a laser system and more particularly to a laser system that includes a nonresonant multiple pass nonlinear structure for producing second harmonic generation (SHG) light.

BACKGROUND

A laser is an optical source that emits photons in a coherent beam. Laser light is typically a single wavelength or color, and emitted in a narrow beam. Laser action is explained by the theories of quantum mechanics and thermodynamics. Many materials have been found to have the required characteristics to form the laser gain medium needed to power a laser, and these have led to the invention of many types of lasers with different characteristics suitable for different applications.

The color or frequency of the emitted light may depend on the characteristics of the gain medium. However, not all desired colors have gain mediums found to reliably reach the color desired. Another method of generating a particular color is called frequency doubling. In frequency doubling, a fundamental laser frequency is introduced into a nonlinear medium and a portion of the fundamental frequency is doubled. Frequency doubling in nonlinear material, also called second harmonic generation, is a nonlinear optical process, in which photons interacting with a nonlinear material are effectively combined to form new photons with twice the energy and, therefore, twice the frequency and half the wavelength of the initial photons.

A polarized material is a material in which light exhibits different properties in different directions within the polarized material. The polarization of a material may make a significant contribution to the nonlinear optical process, since polarization results in charge oscillations within the medium. When laser light propagates in a medium, the associated electromagnetic field generates patterns of electric and magnetic polarization of the medium, which propagate together with the generating optical wave. The interaction of the electric polarization wave with the electromagnetic wave reduces the phase velocity of the combined phenomenon below the vacuum velocity of light. This is termed the index of refraction. The index of refraction is the factor by which the phase velocity is reduced.

One method of producing SHG light provides for a fundamental light, from a seed laser, that may be focused into a nonlinear crystal. Upon traversing the nonlinear crystal in a single pass, the remaining fundamental light is filtered out of the second harmonic output. This method may be an inefficient use of the fundamental light and likely an inefficient utilization of costly nonlinear material.

Another method of generating second harmonic light employs a resonant nonlinear material structure, in other words an intra-cavity SHG. Using this method, the nonlinear material structure is within the lasing cavity of the seed laser. Fundamental light that survives the nonlinear structure without conversion provides feedback to the seed laser. The intra-cavity SHG laser may be difficult to align and control, which may cause instability in the output of the seed laser.

SUMMARY OF THE INVENTION

These and other problems are generally solved or circumvented, and technical advantages are generally achieved by a laser system that includes a nonresonant multiple pass nonlinear structure for the generation of second harmonic light.

In accordance with an illustrative embodiment of the present invention, a system, a structure, and a method for the generation of second harmonic light is provided. A laser system comprises a seed laser that produces a fundamental frequency light, and a nonresonant multiple pass nonlinear structure generates a second harmonic light using the fundamental frequency light. A second harmonic outcoupler outputs the second harmonic light from the laser system and a reflecting structure reflects a remaining portion of the fundamental frequency light back into the nonresonant multiple pass nonlinear structure to generate additional second harmonic light.

In accordance with another aspect of the illustrative embodiments, a nonresonant structure is provided, which comprises a nonlinear portion, wherein the dimensions of the nonlinear portion provide for a plurality of fundamental light paths and wherein second harmonic light may be generated along each of the plurality of fundamental light paths; and a reflecting portion, wherein the reflecting portion reflects, in a single reflection, a fundamental light from a first fundamental light path to a second fundamental light path in the nonlinear portion.

In accordance with yet another aspect of the illustrative embodiments, a method of generating second harmonic light is provided. The method comprises production of a fundamental frequency beam and the input of the fundamental frequency beam into a nonlinear structure on a first light path within the nonlinear structure. A first beam of second harmonic light is generated in the nonlinear structure, and a remaining fundamental frequency beam is reflected from the nonlinear structure back into a second light path in the nonlinear structure. Further, a second beam of second harmonic light is generated in the nonlinear structure and the first and the second beams of second harmonic light are output.

An advantage of the illustrative embodiments includes providing a more efficient use of nonlinear material, thereby saving in initial system costs, and a more efficient use of fundamental frequency light, thereby saving energy.

The foregoing has outlined rather broadly the features and technical advantages of an illustrative embodiment in order that the detailed description of the invention that follows may be better understood. Additional features and advantages of an illustrative embodiment will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the illustrative embodiments as set forth in the appended claims.

BRIEF DESCRIPTION OF THE DRAWINGS

For a more complete understanding of the illustrative embodiments, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that an illustrative embodiment provides many applicable inventive concepts that can be embodied in a wide variety of specific contexts. The specific embodiments discussed are merely illustrative of specific ways to make and use the invention, and do not limit the scope of the invention.

The illustrative embodiments are described with respect to a specific context, namely a semiconductor laser system using a nonlinear crystal to generate second harmonic light. The invention may also be applied, however, to other laser systems such as laser systems comprising alternate seed lasers, alternate nonlinear materials, alternate reflectors, alternate outcouplers, and the like.

Figure 1:
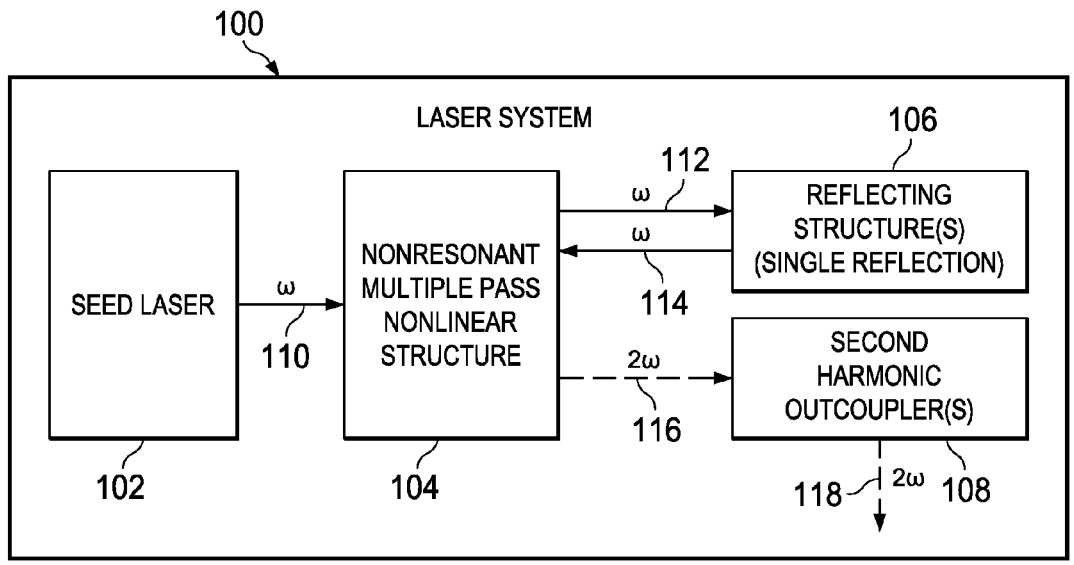
FIG. 1 is a block diagram of a laser system in accordance with the illustrative embodiments.

With reference now to FIG. 1, a block diagram of a laser system in accordance with the illustrative embodiments is shown. Laser system 100 comprises a seed laser 102 and a nonresonant multiple pass nonlinear structure 104. Laser system 100 further comprises a reflecting structure or structures 106 and one or more second harmonic outcouplers 108. Alternatively, fundamental light may be provided to laser system 100 from the output of a coupled laser configuration.

Seed laser 102 produces a fundamental light ($\omega$), which follows light path 110 to nonresonant multiple pass nonlinear structure 104. In nonresonant multiple pass nonlinear structure 104, second harmonic light ($2\omega$) is generated, and follows light path 116 to second harmonic outcoupler 108, where second harmonic light ($2\omega$) leaves the laser system 100 on light path 118. In a preferred embodiment, the second harmonic light passes through reflective structure 106 before entering second harmonic outcoupler(s) 108 (not shown). A portion of the remaining fundamental light ($\omega$) follows light path 112 to reflecting structure 106. From reflecting structure 106 fundamental light ($\omega$) is reflected back to nonresonant multiple pass nonlinear structure 104 on light path 114 and may generate additional second harmonic light. Note that there is no intended light path back to seed laser 102 from nonresonant multiple pass nonlinear structure 104. Therefore, there is substantially no fundamental light ($\omega$) fed back to seed laser 102 after reaching nonresonant multiple pass nonlinear structure 104. The fundamental light ($\omega$) may be reflected back into nonresonant multiple pass nonlinear structure 104 a plurality of times within the scope of an illustrative embodiment.

A further description of each component begins with seed laser 102. While a semiconductor seed laser is described for illustration purposes, seed laser 102 may comprise any type of laser, including semiconductor, gas, dye, solid state, chemical, and metal vapor among others. A semiconductor seed laser 102 may be a distributed Bragg reflector (DBR) laser, a Fabry-Perot laser with a fiber Bragg grating, a distributed feedback (DFB) laser, or the like.

Seed laser 102 is composed of an active gain medium and a resonant optical cavity. The gain medium transfers external energy into the laser beam. The area of the laser in which this transfer occurs is called the gain region. The gain region is a material of controlled purity, size, concentration, and shape, which amplifies the beam by the quantum mechanical process of stimulated emission. The gain region is pumped, or energized, by an external energy source. Examples of pump sources include electricity and light. The pump energy is absorbed by the laser medium, placing some of its particles into excited quantum states. When the number of particles in one excited state exceeds the number of particles in some lower-energy state, population inversion is achieved. In this condition, an optical beam passing through the gain region produces more stimulated emission than the stimulated absorption, so the beam is amplified. The light generated by stimulated emission is very similar to the input light in terms of wavelength, phase, and polarization. The fundamental light may be, for example, infrared (IR) light, however seed laser 102 may produce other frequencies as fundamental light. The term "light" herein refers to electromagnetic radiation, whether or not in the visible frequency range.

The resonant optical cavity of seed laser 102 contains a coherent beam of light between reflective surfaces, for example, a distributed Bragg reflector, so that each photon passes through the gain region more than once before it is emitted from the output aperture or lost to diffraction or absorption. As light circulates through the cavity, passing through the gain region, if the gain in the medium is stronger than the cavity losses, the power of the circulating light rises exponentially. The gain region will amplify any photons passing through it, regardless of direction. However, photons aligned with the resonant optical cavity may likely pass more than once through the medium and therefore have significant amplification. This phenomenon is referred to as resonance. Therefore, a resonant cavity is an arrangement of optical components, which allows a beam of light to circulate through a gain region of a laser system. A nonresonant component is outside the resonant cavity of the seed laser. Standing-wave resonators bounce light back and forth between two end mirrors. Ring resonators circulate light in two different directions. In either case, a resonator may contain additional optical elements, and each of the optical elements is passed in each round trip.

Therefore, there are only certain optical frequencies for which the optical phase is self-consistently reproduced after each round trip. The round-trip phase shift is an integer multiple of $2\pi$. These optical frequencies are the resonance frequencies and are approximately equidistant, but not exactly equidistant, due to dispersion. The highest internal optical power may be achieved when the monochromatic input light has a frequency matching that of one of the modes. Particularly for low-loss resonators, the circulating intra-cavity power may then greatly exceed the input power by means of resonant enhancement.

Semiconductor lasers within the scope of the illustrative embodiments may be based upon different types of materials, depending upon the wavelength region of interest. Three of the materials are III-V semiconductors, consisting of materials in columns III and V of the periodic table. Examples of column III atoms include aluminum (Al), gallium (Ga), indium (In), and thallium (Tl), and examples of column V atoms are nitrogen (N), phosphorus (P), arsenic (As), and antimony (Sb). Semiconductor lasers in the near infrared and extending into the visible may be based on GaAs/AlGaAs layers. Indium phosphide (InP) may be used to produce lasers in the 1.5 μm wavelength region with InP/InGaAlP layered materials. Gallium nitride (GaN) may be used for blue and ultraviolet lasers.

Other laser materials may be based on II-VI compounds, consisting of materials in columns II and VI of the periodic table. Examples of column II atoms are zinc (Zn) and cadmium (Cd). Examples of column VI atoms are sulfur (S), selenium (Se), and tellurium (Te). An example of II-VI compound is zinc selenide (ZnSe). Many more compounds may be used for semiconductor lasers, producing lasers of various wavelengths, and all of them are within the scope of the present invention. However, other types of lasers, such as gas lasers using for example carbon dioxide, argon-ion or helium-neon, may be alternatively used within the scope of these embodiments. Chemical lasers, which are powered by chemical reactions, solid state lasers, using for example ruby or yttrium aluminum garnet (Nd:YAG), and dye lasers are just some examples of different seed lasers that may be used in laser system 100.

Nonresonant multiple pass nonlinear structure 104 comprises a nonlinear material. Nonlinear materials use optical nonlinearities to generate different light frequencies from the fundamental frequencies produced by seed laser 102. Frequency doubling (second harmonic generation SHG) is one such example of a nonlinear process. Frequency doubling occurs when a fundamental light generates another light with twice the optical frequency and half the wavelength, in the nonlinear material. The fundamental light ($\omega$) is produced in seed laser 102 and delivered to nonresonant multiple pass nonlinear structure 104 wherein the frequency-doubled (second-harmonic) light ($2\omega$) is generated in the form of a light beam propagating in a similar direction.

Some examples of non-linear materials include lithium niobate ($LiNbO_3$) and lithium tantalate ($LiTaO_3$). Both materials are available in congruent and in stoichiometric form, with important differences concerning periodic poling and photorefractive effects. Lithium niobate and tantalate are the most often used materials in the context of periodic poling; the resulting materials are called PPLN (periodically poled lithium niobate) and PPLT, respectively, or PPSLN and PPSLT for the stoichiometric versions. Both have a relatively low damage threshold, but do not need to be operated at high intensities due to their high nonlinearity. The tendency for photorefractive damage strongly depends on the material composition, and it can be reduced with MgO doping and/or by using the stoichiometric composition. Therefore, periodically poled Mg doped lithium niobate (PPMgLN) may be employed.

Potassium niobate ($KNbO_3$) has a very high nonlinearity. Potassium titanyl phosphate (KTP, $KTiOPO_4$) also KTA ($KTiOAsO_4$), RTP ($RbTiOPO_4$) and RTA ($RbTiAsPO_4$) are other examples. These materials tend to have relatively high nonlinearities and are suitable for periodic poling. Potassium dihydrogen phosphate (KDP, $KH_2PO_4$) and potassium dideuterium phosphate (KD.P, $KD_2PO_4$) are also common. $K_2Al_2B_2O_7$, KAB, LBO, BBO, CLBO, CBO and other borate crystals may be suitable.

Typically, the nonlinear material is a crystal, however the illustrative embodiments are not limited to a crystal. In non-linear crystals of interest, the electric polarization of the crystal has a component proportional to the square of the electric field. In that case, a first laser light, while propagating through the nonlinear crystal, generates a nonlinear polarization wave with twice the optical input frequency. The nonlinear polarization wave propagates with the phase velocity of the first laser light. This nonlinear polarization wave then radiates another optical field (the second harmonic) at the same frequency. Thus, frequency doubling increases when the radiated second harmonic wave has the same phase velocity as the nonlinear polarization wave.

A radiated second-harmonic wave having the same phase velocity as the nonlinear polarization wave is phase matched. The conversion efficiency of frequency doublers that are not phase matched may be very low. For efficient nonlinear frequency conversion, a matching phase relationship between the interacting waves is maintained along the propagation direction. In other words, the phase mismatch may be close to zero in an efficient nonlinear frequency conversion process.

Quasi-phase matching (QPM) is a technique to achieve similar results as with phase matching of nonlinear interactions, in particular for nonlinear frequency conversion for non-homogeneous nonlinear crystal material. Phase mismatch occurs over some propagation distance, but the nonlinear interaction is reversed at the divisional planes of the periodically poled nonresonant multiple pass nonlinear structure 106.

Periodically poled crystals are arranged for multiple quasi-phase-matched nonlinear interactions in a single crystal. Multiple poling periods (divisional planes) are implemented at regular intervals across the nonlinear crystal. Periodically poled crystals enable quasi-phase-matched laser systems. Frequency doubling to the visible range may require a high poling quality for small poling periods. Periodic poling involves a process that generates a periodic reversal of the domain orientation in a nonlinear crystal, so that the sign of the nonlinear coefficient also changes. The poling period (the period of the divisional planes) determines the wavelengths for which certain nonlinear processes can be quasi-phase-matched.

Ferroelectric nonlinear crystal materials which are suitable for periodic poling with electric fields include lithium niobate ($LiNbO_3$), lithium tantalate ($LiTaO_3$), potassium titanyl phosphate (KTP, $KTiOPO_4$), KTA ($KTiOAsO_4$), and the like. The periodically poled materials are often given a name beginning with "PP", for example PPKTP (periodically poled KTP), PPLN (periodically poled lithium niobate) or PPLT (periodically poled lithium tantalate). PPLN and PPLT crystals may be used in frequency doubling applications. PPLN may be doped with magnesium (PPMgLN) and the like.

Nonresonant multiple pass nonlinear structure 104 does not circulate light back into the gain region of seed laser 102. Rather, after entering the nonresonant multiple pass nonlinear structure 104, the fundamental light is substantially confined between the reflecting structures 106 and the nonresonant multiple pass nonlinear structure 104. Nonresonant multiple pass nonlinear structure 104 and reflecting structures are configured to allow the fundamental beam to take multiple passes through the nonlinear material and may therefore more efficiently use the fundamental frequencies produced by seed laser 102.

Reflecting structure(s) 106 may be any reflecting structure such as, for example, mirrors, as in one embodiment, or reflective coatings, as in another embodiment. Reflecting structures may transmit some frequencies of light and reflect other frequencies of light. Therefore, second harmonic light may substantially pass through reflecting structures 106 while fundamental light may be substantially reflected by reflecting structures 106. Reflecting structure 106 may bounce back the fundamental light into nonresonant multiple pass nonlinear structure 104 using a single reflection. A pass through the nonresonant multiple pass nonlinear structure 104 means the instance of a light beam passing through at least a portion of the nonresonant multiple pass nonlinear structure 104 without redirection from a reflective surface or a material boundary. The incident fundamental light (ω) takes light path 112 and the reflected fundamental light (ω) takes light path 114. Laser system 100 may have a plurality of these single reflection apparatuses reflecting fundamental light emitted from various positions of the nonresonant multiple pass nonlinear structure 104.

Outcoupler(s) 108 may be any structure that allows the second harmonic light to leave the laser system on light path 118. Outcoupler(s) 108 may be reflecting structure(s) 106, a part of reflecting structure(s) 106, or a structure separate from reflecting structure(s) 106. Outcoupler 108 may incorporate a light filter or may not, within the scope of the illustrative embodiments. Laser system 100 may have a plurality of outcouplers, which output second harmonic light, or a system of outcouplers, which combine the second harmonic beams to a single output, in accordance with the illustrative embodiments.

Figure 2:
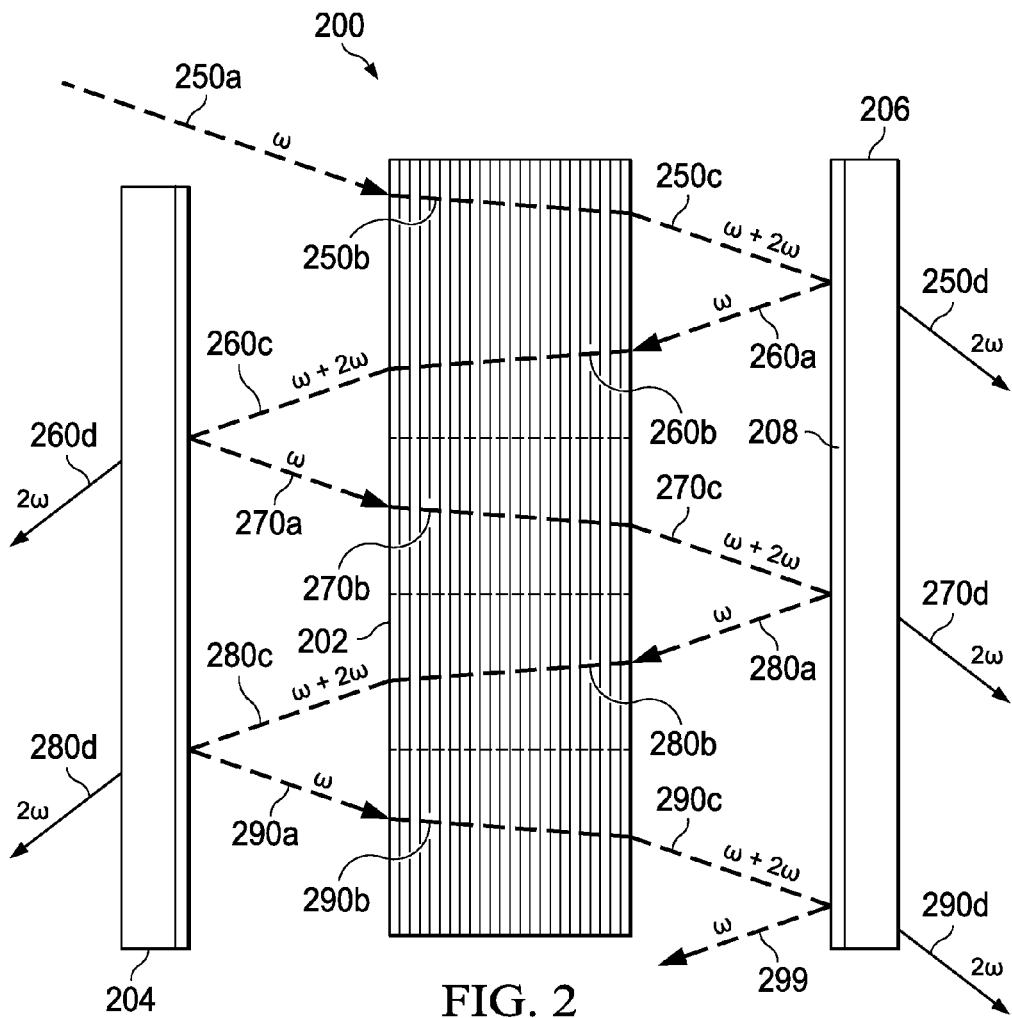
FIG. 2 shows a plan view of an embodiment of nonresonant multiple pass nonlinear material structure with reflecting structures.

Turning now to FIG. 2, an embodiment of a nonlinear material structure such as nonresonant multiple pass nonlinear structure 104 in FIG. 1 is shown with reflecting structures 204 and 206, which are examples of reflecting structure(s) 106 in FIG. 1. Nonlinear material apparatus 200 is comprised of nonlinear material 202 and reflecting structures 204 and 206. Nonlinear material 202 is periodically poled. Periodically poled material has divisional planes. These periodically poled divisional planes are parallel to each other and are regularly spaced depending on the second harmonic generation frequency. The vertical lines depicted in nonlinear material 202 represent periodically poled divisional planes. Reflecting structures 204 and 206 are configured so that fundamental frequency light (ω) is reflected and second harmonic light (2ω) passes through reflecting structures 204 and 206. This may be accomplished by a coating or multiple coatings such as coating 208. Processes used to implement coating 208 are well known in the art and will not be further discussed herein. Light paths 250, 260, 270, 280, and 290 are shown in four parts. Light path 250a is the portion of light path 250 that is coming from a seed laser such as seed laser 102 in FIG. 1. Light path portion 250b is the portion of the light path that is in the nonlinear material. Light path 250b is the portion of light path 250 that generates the second harmonic light (2ω). Light path 250c is the portion of the light path that has both fundamental light and second harmonic light. As the incident light beam hits the reflecting structure, the fundamental light (ω) is reflected back along light path 260 and the second harmonic light passes through reflecting structure 206 on light path 250d. Following the fundamental light on light path 260a, it can be seen that the fundamental light (ω) passes again through nonlinear material 202, where the fundamental light (ω) again generates second harmonic light (2ω) on light path 260b. The fundamental light (ω) and second harmonic light (2ω) is incident on reflecting structure 204, where the fundamental light (ω) is reflected onto light path 270 and the second harmonic light (2ω) passes through reflecting structure 204 and onto an outcoupling apparatus (not shown), such as second harmonic outcoupler(s) 108 in FIG. 1. Nonlinear apparatus 200 may have any number of light paths, such as light paths 250, 260, 270 and 280, within the scope of these illustrative embodiments each comprised of four parts as described for light path 250. Note that the optical length of light paths 250b, 260b, 270b, 280b, and 290b may be of substantially equal length. Each light path 250b, 260b, 270b, 280b, and 290b represents a single pass through nonlinear material 202.

Figure 3:
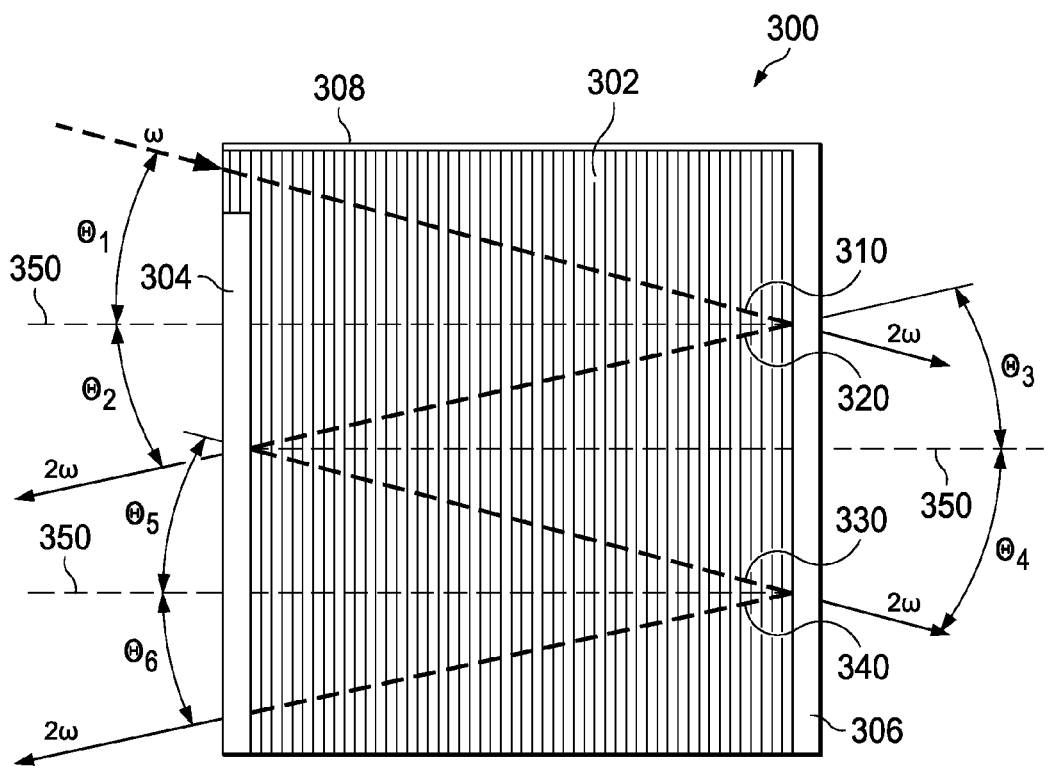
FIG. 3 shows a plan view of another embodiment of a nonresonant multiple pass nonlinear material structure with reflecting structures.

FIG. 3 shows a plan view of another embodiment of a nonresonant multiple pass nonlinear structure with an internal reflection configuration. Reflecting structures 304 and 306 are examples of reflecting structure(s) 106 in FIG. 1. Reflecting structures 304 and 306 are in the form of crystal coatings that may function similarly to the reflective structures 204 and 206 in FIG. 2. The fundamental light (ω) enters nonlinear material 302 at a window area 308 on light path 310. As the fundamental light (ω) traverses nonlinear material 302, second harmonic light (2ω) is generated. When the light beam is incident on reflective structures 306, the fundamental light (ω) is reflected back into nonlinear material 302 and the second harmonic light (2ω) passes through reflective structure 306. Following the fundamental beam (ω) onto light path 320, more second harmonic light (2ω) is generated as it travels through nonlinear material 302. Again, reflective structure 304 reflects the fundamental beam (ω) and allows the second harmonic beam (2ω) to pass from the system. The fundamental light may be reflected a plurality of times within the scope of an illustrative embodiment, such as on light paths 310, 320, 330, and 340.

Note that in the nonlinear material, the propagation vector of the incident fundamental beam (light path 310) makes an angle $\Theta_1$ with respect to the normal 350 of the periodically poled divisional planes (represented as vertical lines in the nonlinear material). In addition, the propagation vector (light path 320) of the reflected fundamental beam (ω) makes a substantially congruent angle with respect to the normal 350 of the periodically poled divisional planes. This symmetry allows both the incident and the reflected fundamental beams to be phase matched for second harmonic generation, at the same temperature of the nonlinear material, at the same time. In another embodiment, the time of the incident fundamental light within a light path in the nonlinear material may be substantially equivalent to the time each reflected fundamental light is within a light path in the nonlinear material, with or without a configuration of substantially congruent angles.

Figure 4:
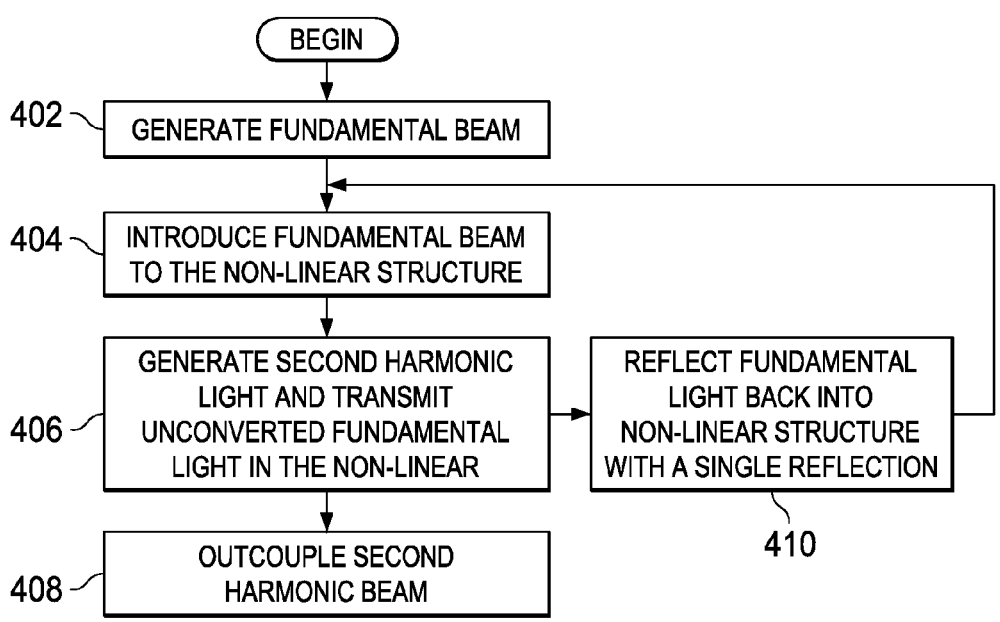
FIG. 4 is a flow chart of a method for generating a second harmonic frequency in a laser system.

FIG. 4 is a flow chart of a method for generating a second harmonic frequency in a laser system. The process begins, as a fundamental beam is generated (step 402). Step 402 occurs in a seed laser such as seed laser 102 in FIG. 1. Alternatively, the fundamental beam may be produced in another laser system. The fundamental beam is then introduced into a nonlinear material structure (step 404) the nonlinear material structure may be a nonresonant multiple pass nonlinear structure such as nonresonant multiple pass nonlinear structure 104 in FIG. 1. Within the nonlinear material structure, second harmonic light is generated and a remaining portion of fundamental light is passed through the nonlinear material with the second harmonic light (step 406). The second harmonic light is outcoupled from the system (step 408) and a portion of the remaining fundamental light is reflected back into the nonlinear material (step 410). In an embodiment the fundamental light may be redirected back into the nonlinear material in a single reflection. Steps 408 and 410 may use structures such as reflecting structure(s) 106 and second harmonic outcoupler(s) 108 in FIG. 1.

Advantages of the system, structure, and method described herein may include providing a lower operating cost second harmonic generation system with the efficient use of fundamental light generated by a seed laser. Another advantage may be a more cost effective use of costly nonlinear material. Yet another advantage may be a stable second harmonic output.

Although the illustrative embodiment and its advantages have been described in detail, it should be understood that various changes, substitutions, and alterations can be made herein without departing from the spirit and scope of the invention as defined by the appended claims.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A laser system comprising:
a seed laser that produces a fundamental frequency light;
a nonresonant multiple pass nonlinear structure which generates a second harmonic light using the fundamental frequency light;
at least one reflecting structure that reflects a remaining portion of the fundamental frequency light from the nonresonant multiple pass nonlinear structure back into the nonresonant multiple pass nonlinear structure to generate an additional second harmonic light; and
at least one second harmonic outcoupler that outputs the second harmonic light and the additional second harmonic light from the laser system.

2. The laser system of claim 1, wherein the at least one reflecting structure is configured to reflect an incident fundamental frequency light back into the nonresonant multiple pass nonlinear structure in a single reflection.

3. The laser system of claim 1, wherein the nonresonant multiple pass nonlinear structure is configured to accommodate at least two passes, and wherein each pass through the nonresonant multiple pass nonlinear structure comprises an instance of a light beam passing through at least a portion of the nonresonant multiple pass nonlinear structure with substantially no redirection from a reflective surface or a material boundary.

4. The laser system of claim 1, wherein the nonresonant multiple pass nonlinear structure comprises a periodically poled crystal with substantially parallel divisional planes.

5. The laser system of claim 1, wherein an incident fundamental frequency light and a reflected fundamental frequency light both meet a phasematching condition of the nonresonant multiple pass nonlinear structure.

6. The laser system of claim 1, wherein a first optical path length, of a first pass of fundamental frequency light through the nonresonant multiple pass nonlinear material structure is substantially equivalent to a second optical path length, of a second pass of fundamental frequency light through the nonresonant multiple pass nonlinear structure.

7. The laser system of claim 1, wherein the seed laser comprises a semiconductor laser.

8. The laser system of claim 1, wherein substantially no fundamental frequency light is provided to the seed laser as feedback following each pass through the nonresonant multiple pass nonlinear structure.

9. A nonresonant structure comprising:
a nonlinear portion, wherein the dimensions of the nonlinear portion provide for a plurality of passes of fundamental light through the nonlinear portion, each pass through the nonlinear portion comprising an instance of a light beam passing through at least a portion of the nonresonant multiple pass nonlinear structure with substantially no redirection from a reflective surface or a material boundary, and wherein second harmonic light is generated along each of the plurality of passes; and
a reflecting portion, wherein the reflecting portion reflects a fundamental light from a first pass in the nonlinear portion to a second pass in the nonlinear portion.

10. The nonresonant structure of claim 9, wherein following each pass in the nonlinear portion, substantially no fundamental light comprises a laser gain feedback.

11. The nonresonant structure of claim 9, wherein the reflecting portion reflects a fundamental light from a first pass in the nonlinear portion to a second pass in the nonlinear portion in a single reflection.

12. The nonresonant structure of claim 9, wherein the nonlinear portion comprises a nonlinear crystal.

13. The nonresonant structure of claim 9, wherein the reflecting portion comprises a multilayered coating on the nonlinear crystal.

14. The nonresonant structure of claim 9, wherein the reflecting portion comprises a mirror structure.

15. A method of generating second harmonic light, the method comprising:
producing a fundamental frequency beam;
inputting the fundamental frequency beam into a nonlinear structure in a first pass, wherein a pass through the nonlinear structure comprises an instance of the fundamental frequency beam passing through at least a portion of the nonlinear structure with substantially no redirection from a reflective surface or a material boundary;
generating a first beam of second harmonic light in the nonlinear structure from a portion of the fundamental frequency beam;
reflecting a remaining fundamental frequency beam from the nonlinear structure into a second pass in the nonlinear structure;
generating a second beam of second harmonic light in the nonlinear structure from a portion of the remaining fundamental beam; and
outputting the first and the second beams of second harmonic light.

16. The method of claim 15, wherein the reflecting a remaining fundamental frequency beam from the nonlinear structure into a second pass in the nonlinear structure is performed by a single reflection.

17. The method of claim 15, wherein the nonlinear structure comprises a periodically poled nonlinear crystal.

18. The method of claim 15, further comprising:
directing an incident fundamental frequency beam in a first angle with respect to the normal of a periodically poled divisional plane of the nonlinear structure; and
reflecting a reflected fundamental frequency beam in a second angle with respect to the normal of a periodically poled divisional plane of the nonlinear structure, wherein the first angle is substantially congruent to the second angle.

19. The method of claim 15, wherein a first optical path length of an incident fundamental frequency light on a first pass through the nonlinear structure is substantially equivalent to a second optical path length of a reflected fundamental frequency light on a second pass through the nonlinear structure.

* * * * *